UNITED STATES PATENT OFFICE.

CARL FRIEDERICH MARIA SCHAERGES AND PAUL SCHWARZ, OF BASLE, SWITZERLAND, ASSIGNORS TO F. HOFFMANN-LA ROCHE & CO., OF SAME PLACE.

PROCESS OF MAKING ALKALINE ACETOSULFANILATE.

SPECIFICATION forming part of Letters Patent No. 602,646, dated April 19, 1898.

Application filed April 13, 1897. Serial No. 632,037. (Specimens.)

*To all whom it may concern:*

Be it known that we, CARL FRIEDERICH MARIA SCHAERGES, doctor of philosophy and chemist, and PAUL SCHWARZ, doctor of philosophy and chemist, residing at Basle, Switzerland, subjects of the Emperor of Germany, have invented a useful Improvement in the Manufacture of Pharmaceutical Products, of which the following is a clear and complete specification.

Our invention relates to the production of a new pharmaceutical product which has antipyretic and antineuralgic properties and is an alkaline acetosulfanilate in a pure state. This new body is prepared by the acetylization of an alkaline salt of sulfanilic acid with glacial acetic acid.

We have found that glacial acetic acid is necessary to effect the acetylization of sulfanilate of sodium, as also of other alkaline metals, in order to produce a pure product. Besides the main reaction according to the equation

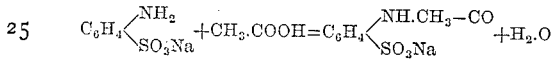

there are formed small quantities of free sulfanilic acid and acetate of sodium, as may be found by testing the product of the reaction. The former remains undissolved when the product of the reaction is dissolved in half its weight of water, while the latter can be extracted from the melted mass by means of alcohol of high strength.

In carrying out our process practically we proceed as follows: Equal parts of parasulfanilate of sodium and glacial acetic acid are heated to boiling-point in a return-flow cooler and kept boiling during six to eight hours. The acetic acid in excess is then distilled off as far as possible, and the residue is dissolved in the least possible quantity (about half its weight) of hot water. The solution is separated by filtration from the undissolved portion and is precipitated in the cold by means of alcohol of ninety-eight to ninety-nine per cent. The precipitate is collected, washed in strong alcohol, treated in a centrifugal extractor, and dried.

Instead of alcohol alone alcohol with a subsequent addition of ether can be employed to effect the precipitation. In such a case, however, it is necessary to remove the acetate of sodium from the product of reaction by boiling with spirits of wine before the said product is dissolved in water.

The final product obtained in the one way or the other is readily soluble in water, soluble with difficulty in alcohol, and insoluble in ether. The aqueous solution when mixed with a solution of iron chlorid (reagent) does not give the reaction of acetate of sodium (red color) and consists of a white hygroscopic substance in minute crystals. The pure acetosulfanilate of sodium is employed as an antipyretic and excels antifebrin in being soluble in water and therefore in acting more rapidly.

The dose for an adult is one gram, and the maximum quantity taken during twenty-four consecutive hours should not exceed ten grams.

What we claim is—

The herein-described process for the preparation of a pure alkaline acetosulfanilate for use in medicine, which consists in first acetylizing an alkaline salt of sulfanilic acid by means of glacial acetic acid, and then freeing the product of reaction from free sulfanilic acid and alkaline acetate by means of water and alcohol.

In witness whereof we have hereunto signed our names in the presence of two subscribing witnesses.

CARL FRIEDERICH MARIA SCHAERGES.
PAUL SCHWARZ.

Witnesses:
GEORGE GIFFORD,
ALFRED NAPFLE.